United States Patent [19]

Watnick

[11] Patent Number: 5,724,040

[45] Date of Patent: Mar. 3, 1998

[54] AIRCRAFT WAKE VORTEX HAZARD WARNING APPARATUS

[75] Inventor: Marshall Watnick, Trumbull, Conn.

[73] Assignee: Northrop Grumman Corporation, Los Angeles, Calif.

[21] Appl. No.: 602,426

[22] Filed: Feb. 16, 1996

Related U.S. Application Data

[63] Continuation-in-part of Ser. No. 494,119, Jun. 23, 1995, Pat. No. 5,557,278.

[51] Int. Cl.$^6$ .................................................. G01S 13/95
[52] U.S. Cl. ........................... 342/26; 342/460; 342/33
[58] Field of Search ................................ 342/26, 460, 33

[56] References Cited

U.S. PATENT DOCUMENTS

| | | | |
|---|---|---|---|
| 4,058,010 | 11/1977 | Woodhouse | 73/170.07 |
| 4,516,125 | 5/1985 | Schwab et al. | 343/7.7 |
| 4,712,108 | 12/1987 | Schwab | 342/26 |
| 4,735,503 | 4/1988 | Werner et al. | 356/28.5 |
| 5,208,600 | 5/1993 | Rubin | 242/26 |
| 5,557,278 | 9/1996 | Piccirillo et al. | 342/29 |

OTHER PUBLICATIONS

"Airport Movement Area Safety System" by Marshall Watnick and Joseph W. Ianniello, United Technologies Norden Systems, Inc., prepared for IEEE/AIAA Digital Avionics Systems Conference, Seattle, WA, Oct. 5–8, 1992.

"Airport Surface Collision Warning System Implementation" by Joseph M. Ianniello and Raymond M. Kruczek, United Technologies Norden Systems, Inc., presented at IEEE/AIAA Digital Avionics Systems Conf. and Technicla Display, Fort Worth TX, Oct. 25–28, 1993.

*Primary Examiner*—John B. Sotomayor
*Attorney, Agent, or Firm*—Walter G. Sutcliff

[57] ABSTRACT

An apparatus for monitoring the position of objects in a space including a target supervisor, a location supervisor, and a hazard monitoring supervisor. The apparatus can detect and respond to a potential wake-vortex hazard condition. The tracking supervisor receives target data from a sensor, characterizes and tracks selected objects, and provides target outputs having features respective of the selected objects. The location supervisor characterizes and displays features in the space, and provides a location output having the aforementioned features. The hazard monitoring supervisor detects and responds to potential hazard conditions, and provides a notice of such conditions, responsive to the target outputs and the location output. A data logger selectively retains the target outputs, the location output, or both. The position monitoring apparatus has six modes: full operation, non-airport-surveillance-radar, isolation, set-up, adaptation, and simulation. The target supervisor receives data from an airborne surveillance radar, a secondary surveillance radar, a global-positioning-system-based sensor, a ground-based sensor, or an auxiliary sensor.

11 Claims, 4 Drawing Sheets

AIRCRAFT WAKE VORTEX HAZARD WARNING APPARATUS

RELATED APPLICATIONS

This application is a continuation-in-part of U.S. patent application Ser. No. 08/494,119 now U.S. Pat. No. 5,557, 278 filed Jun. 23, 1995 which is incorporated herein by reference and which is assigned to the same assignee hereof. This application also is related to co-pending patent application Ser. No. 08/494,118, filed Jun. 23, 1995, entitled "Aircraft Landing Determination Apparatus and Method," which also is incorporated herein by reference and which also is assigned to the same assignee hereof.

BACKGROUND OF THE INVENTION

1. Field of the Invention

The invention herein relates to air traffic control systems, and particularly to air traffic control systems integrating airborne and ground-based target tracking and providing an integrated hazard response and, more particularly, to air traffic control systems as described, the integrated hazard response of which identifies and warns of potential aircraft wake vortices.

2. Description of the Related Art

Certain aircraft accidents are believed to be caused by aircraft wake vortices. Aircraft wake vortices are tubes of rapidly-spinning air that emanate from the wingtips of an aircraft, and rotate in opposite directions as the air from the underside of each wingtip tries to swirl up and over the wing. In essence, a wake vortex behaves as a horizontal tornado. In general, the intensity of the vortex is greater for aircraft that are larger, heavier, and slower. The counter-rotating tubes of air can upset an aircraft, which may be following below and behind a larger aircraft, causing the following aircraft to dramatically lose lift or even flip over, which may cause an irreversible nose-dive with fatal results.

In one such accident, a small corporate aircraft approached an airport in good weather for a routine landing but, four miles short of the runway, the aircraft pitched into a 45-degree dive, killing all five passengers. An investigation into this and similar small craft accidents implicated wake vortices from nearby larger aircraft. In addition, the wake vortex phenomenon is believed to be at least a contributing factor in the crashes of several larger aircraft, each resulting in scores of fatalities.

Medium-range airport surveillance radar, such as the Automated Radar Terminal System (ARTS) is good for detecting and tracking many aircraft within a large volume of airspace. However, such systems do not provide adequate surveillance coverage for detecting and warning of potential wake vortex hazard situations. A busy airport is an environment having a vast number of possible conflict situations. Continuous situation monitoring in fog, snow, at night, and under other adverse conditions, can cause fatigue in human controllers which may lead to a collision or wake-vortex-related crash. In such a dynamic environment, the potential for collision between any given aircraft and any one of possibly many nearby approaching airborne aircraft may not be recognized until it is too late to avoid the hazard. Furthermore, it is possible for a potential wake vortex conflict to emerge rapidly but undetected, resulting in an aircraft crash. Also, the occurrence of a conflict in one area of the airport may draw the controllers' attention away from evolving conflict situations elsewhere.

What is needed is apparatus that can integrate inputs from disparate sensor systems to aid controllers in adverse conditions, such as poor visibility conditions or peak traffic periods, and provide an improved means of detecting and alerting the controller to a potential airborne conflict involving one aircraft following another wake-vortex-generating aircraft.

SUMMARY OF THE INVENTION

The invention herein provides an apparatus for monitoring the position of multiple objects in a predefined space, and includes a target supervisor, a location supervisor, and a hazard monitoring supervisor. The target supervisor characterizes and tracks selected objects, receiving target data from at least one sensor. The target supervisor also provides a plurality of target outputs having multiple predetermined features respective of the selected objects. The location supervisor characterizes and displays multiple, predetermined features respective of the predefined space, and provides a location output having the aforementioned predetermined features therein. The hazard monitoring supervisor detects and responds to a potential wake vortex hazard condition. This supervisor provides a detectable notice of such hazard condition, responsive to the target outputs and the location output. The apparatus can also include a data logger for selectively retaining the target outputs, the location output, or both.

The target supervisor can include a target collector for extracting a plurality of target tracks from the target data, and tracking the tracks over a predetermined period of time. The target supervisor further can include a target manager for determining the predetermined features respective of the selected objects responsive to the target data. The location supervisor can include an adaptation manager for providing selected portions of the predetermined features respective of the predefined space. The hazard monitoring supervisor can include a hazard avoidance manager which can respond to the wake vortex hazard condition according to a predetermined selectable set of hazard avoidance logic rules. The hazard monitoring supervisor can also include an alarm manager for determining a manner of presentation of the detectable notice. In addition, the hazard monitoring supervisor can include a situation display manager for providing a visual display, an aural display, a printed display, or an automatically-generated warning transmission, responsive to the predetermined hazard condition. The data logger can include an event logger as well as an adaptation logger. The target collector can include an interface unit between at least one air surveillance device, including an airport surveillance radar and position monitor, and systems based upon the global-positioning-system, infrared, or laser sensors.

The position monitoring apparatus can have six modes: a full operation mode, a non-airport-surveillance-radar mode, an isolation mode, a set-up mode, an adaptation mode, and a simulation mode. It also can have an integrator mode wherein the target supervisor receives the target data from multiple sensors, at least one of the sensors being of a type different from a respective other. In this mode, the target supervisor can integrate the disparate target data to provide the target outputs. Each of the sensors from which the target supervisor can receive data is from the group consisting of an airborne surveillance radar, a secondary surveillance radar, a global-positioning-system-based sensor, a ground-based sensor, and an auxiliary sensor.

Other details, objects, and advantages of the invention will become apparent as the following description of certain present preferred embodiments thereof proceeds. The accompanying drawings show presently preferred embodiments of the invention.

DETAILED DESCRIPTION OF THE EMBODIMENTS

Figure 1:
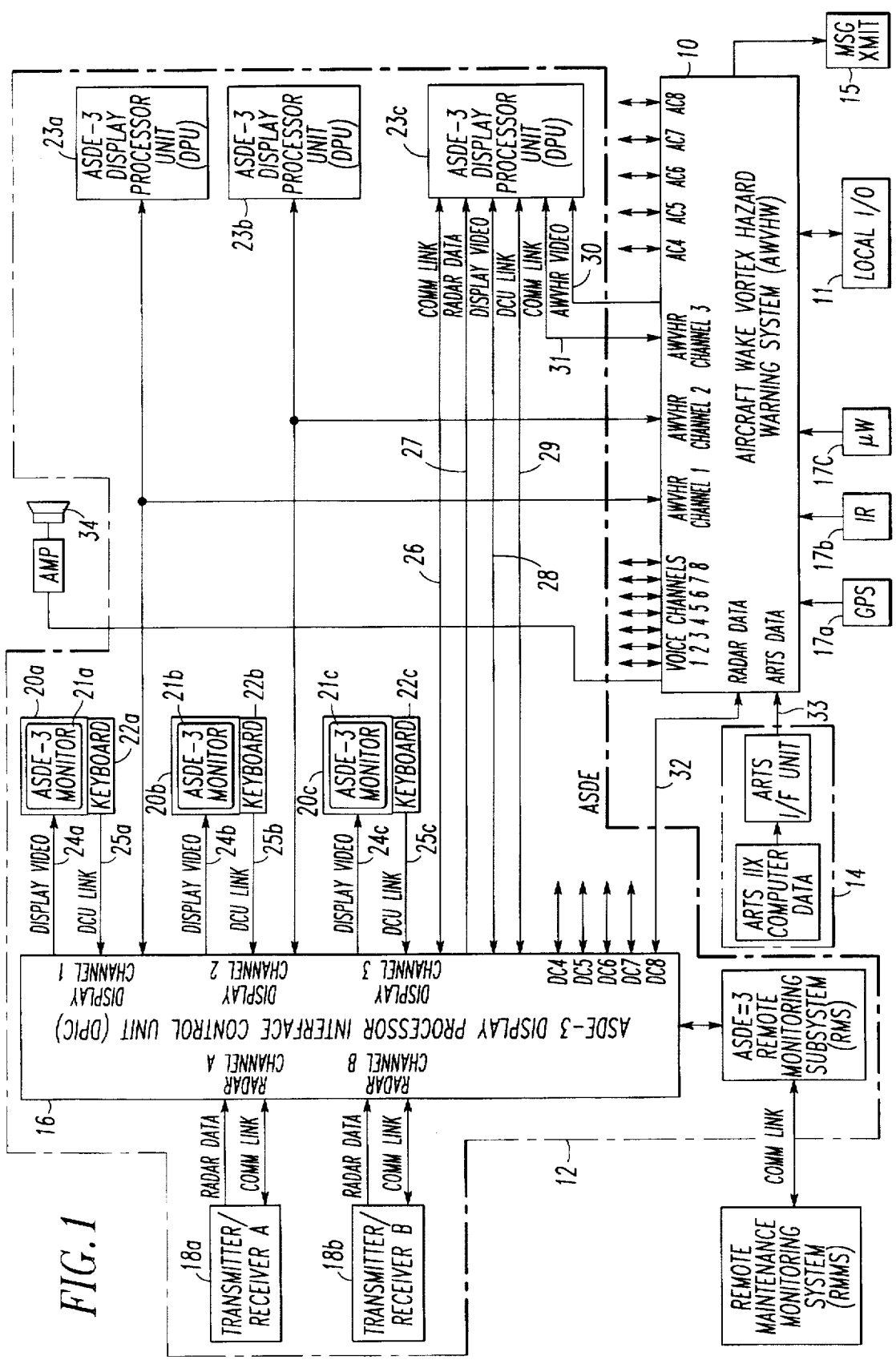
FIG. 1 is an illustration of the functional relationship between an ASDE system, an ARTS system, an AIHR system, auxiliary sensors, and the AWVHW according to the invention herein.

The invention herein can provide an aircraft wake vortex hazard warning (AWVHW) apparatus which can supply pilots and controllers with automatic conflict warnings and alerts, enabling them to act swiftly to reduce the incidence of potential wake-vortex-related accidents. The AWVHW can analyze multiple aircraft movements for indications of possible wake vortex conflicts, and can automatically alert controllers to inadequate vehicle spacing aloft, and inappropriate or unauthorized movements or positioning within the airport area and its associated airspace. The AWVHW can track a preselected number of targets including aircraft on final approach, as well as those that are departing or landing. When used in conjunction with an airport integrated hazard response (AIHR) system, as described in U.S. Pat. No. 5,557,278, objects proximate to the runway surface also can be monitored. Such objects can include trucks, people, animals, and taxiing or stopped aircraft. Targets may be represented as computer-generated symbols, improving display readability.

The AWVHW can provide the ASDE-3 or other surveillance display with an overlay of symbology on the display map coordinates covering the approach airspace around an airport which may be zoomed, windowed, offset, and rotated. This information also may be remotely linked to displays at other locations including in aircraft or vehicles. By zooming in on a particular area of interest, controllers in the tower cab or other observers can see images of planes on the radar display consoles. The AWVHW can provide position monitoring of a predefined space which can include airport surfaces at the ground and a preselected range of air space thereabove, for example, 360 degrees in azimuth and about 0–10 nmi in range or about 20 degrees in azimuth and about 0–5 nmi in range. Also, altitude filtering could be performed using operator-selected altitude bands which may be compared against known aircraft altitudes as reported by any of the aircraft surveillance sensors.

The AWVHW can utilize information from a number of sources to develop current and projected locations of moving objects compared to defined data surfaces. In addition to surface-based data from an ASDE system, such other sources may include, for example, nearby-airborne-target data from ARTS, tracking data from SSR, absolute spatial location data from GPS devices, vectored location information from squittering systems and other information from auxiliary sensors. Auxiliary sensors may include microwave, laser, and IR sensing systems. The AWVHW can provide fusion of disparate sensor data so that controllers can comprehend and respond appropriately to the nature and priority of a plurality of possible hazard situations.

Predicted and actual trajectories of each object are computed and compared with the predicted and actual trajectories of all other objects in a predefined portion of air space. When used with an AIHR system, the predefined space also can include a ground surface and a predetermined portion of the airspace thereabove. Based on information such as the movement state, previous locations, vehicle type and size, aircraft altitude, predetermined separation distances, airport geometry, approach paths, and the like, AWVHW can determine if each moving object exceeds allowable preset limits for each movement state, aircraft type and altitude, and status with respect to other aircraft.

The region of interest can be divided into predetermined air space sectors so that object locations may be determined relative to those sectors. Each sector may, in turn, be divided into a plurality of hazard logic cells, each of which may be analyzed for the existence of a potential wake vortex conflict. In addition, direct target-to-target data can be analyzed. A hazard avoidance manager can analyze the plurality of data inputs to classify an existing situation. The existence of the alert condition can be raised by a comparison of the actual situation with graphical data tables which may contain predefined rules such as, for example, aircraft spacing rules based on factors such as aircraft type, separation distances, absolute and relative altitude data, and aircraft closing rates. These alerts may be used to create voice and display messages or audio/visual alarms, and can control traffic lights, data link messages to operators or pilots, and send information to remote master controllers or vehicle operators.

The AWVHW can provide visual and aural alarms for separation rule violations. Advisories for cautions and warnings involving aircraft, and approach paths to runways can be provided. Visual alarms may be provided at each controller position with an ASDE-3 display. A common tower cab aural alarm can be provided via loudspeaker in the tower cab. Map editors may be provided in the adaptation manager to define areas of interest for which valid sensor data is available. This information can be provided to the hazard monitoring supervisor to detect potentially hazardous wake vortex situations.

The AWVHW can have a display processor which generates display information mixed with information provided to ASDE operational display units (ODU) to provide overlaid video images. In addition, the entry device for AWVHW can be the ASDE-3 display control unit (DCU), or a local personal computer or computer workstation platform (collectively, PC platform). AWVHW equipment may be kept in the tower equipment room except for a loudspeaker and amplifier in the tower cab therefore reducing the amount of equipment required in the tower cab. AWVHW can communicate with a plurality of ASDE display channels, for example, eight ASDE display channels. This AWVHW unit can also communicate with, and be a component of, an AIHR system. In the case where the AWVHW is a component of the AIHR system, the AIHR system includes the input and output devices, which devices may not be included in the AWVHW unit.

FIG. 1 illustrates the operation of AWVHW 10 in conjunction with ASDE system 12, ARTS system 14, and auxiliary sensors such as global-positioning-system-based sensor 17a, infrared-based sensor 17b, and microwave-based sensor 17c. ASDE system 12 can be of the ASDE-3 type, or system 12 can be another surveillance system, or display system, or both. In general, the ASDE display processor interface control (DPIC) unit 16 can receive data from radar transceivers 18a, 18b. Each of ASDE controller work stations 20a–c can include monitor 21a–c for data display and input devices 22a–c for data entry by controllers. Each of work stations 20a–c can be associated with any of ASDE display processor units (DPU) 23a–c. DPIC 16 routes display video signals 24a–c to monitors 21a–c from any of DPUs 23a–c.

Similarly, DPIC 16 routes controller keyboard input through DCU link 25a–c to any single DPU 23a–c. Although not shown specifically in conjunction with DPU 23a and 23b, the various signals communicated by DPIC 16 and a DPU are shown with regard to DPU 23c. For example, DPIC 16 and DPU 23c can share communication data along bidirectional communication link 26. Radar data 27 are received by DPU 23c and processed to provide display video 28, which in turn, can be routed to ASDE monitors 21a–c. Controller information input and display control signals are transmitted along DCU link 29 between DPIC 16 and DPU 23c. It is possible for AWVHW 10 to provide additional display information to the controllers by providing an additional video signal 30 for processing by DPU 23c which signal 30 is mixed with other data within DPU 23c to form a composite video signal which is transmitted by display video signal 28 to ASDE monitor 21c or other display as commanded by the DPIC.

Communication between AWVHW 10 and DPU 23c may be facilitated by bidirectional communication link 31. To provide the radar data necessary for hazard analysis and response, and video input to DPU 23a–c, radar signal 32 can be provided to AWVHW 10 from DPIC 16. AWVHW 10 can also accept data signal 33 from ARTS unit 14 so that radar returns from airborne aircraft can be fused in AWVHW 10, processed for safety checks, transmitted to DPU 23c via video signal 30 or both, and be routed to DPIC 16 over display video signal 28 for display on monitor 21c on workstation 20c. AWVHW 10 can provide audible signals through audible alarm 34, which signals may include synthesized voice and tone signals. Furthermore, AWVHW 10 can provide automatically-generated information, such as a digital warning message, which can be directed to remote users, such as pilots, by message transmitter 15, responsive to a detected potential wake vortex conflict.

AWVHW 10 can work with ASDE system 12 or as a stand-alone device, and with other auxiliary sensor systems. Where AWVHW 10 is used as a stand-alone device, without ASDE system 12, local terminal 11 can be included with AWVHW 10 to permit, for example, keyboard input, and voice and visual output. Such a minimally-configured system might be desirable, for example, at smaller airports that may not have ASDE units.

Figure 2:
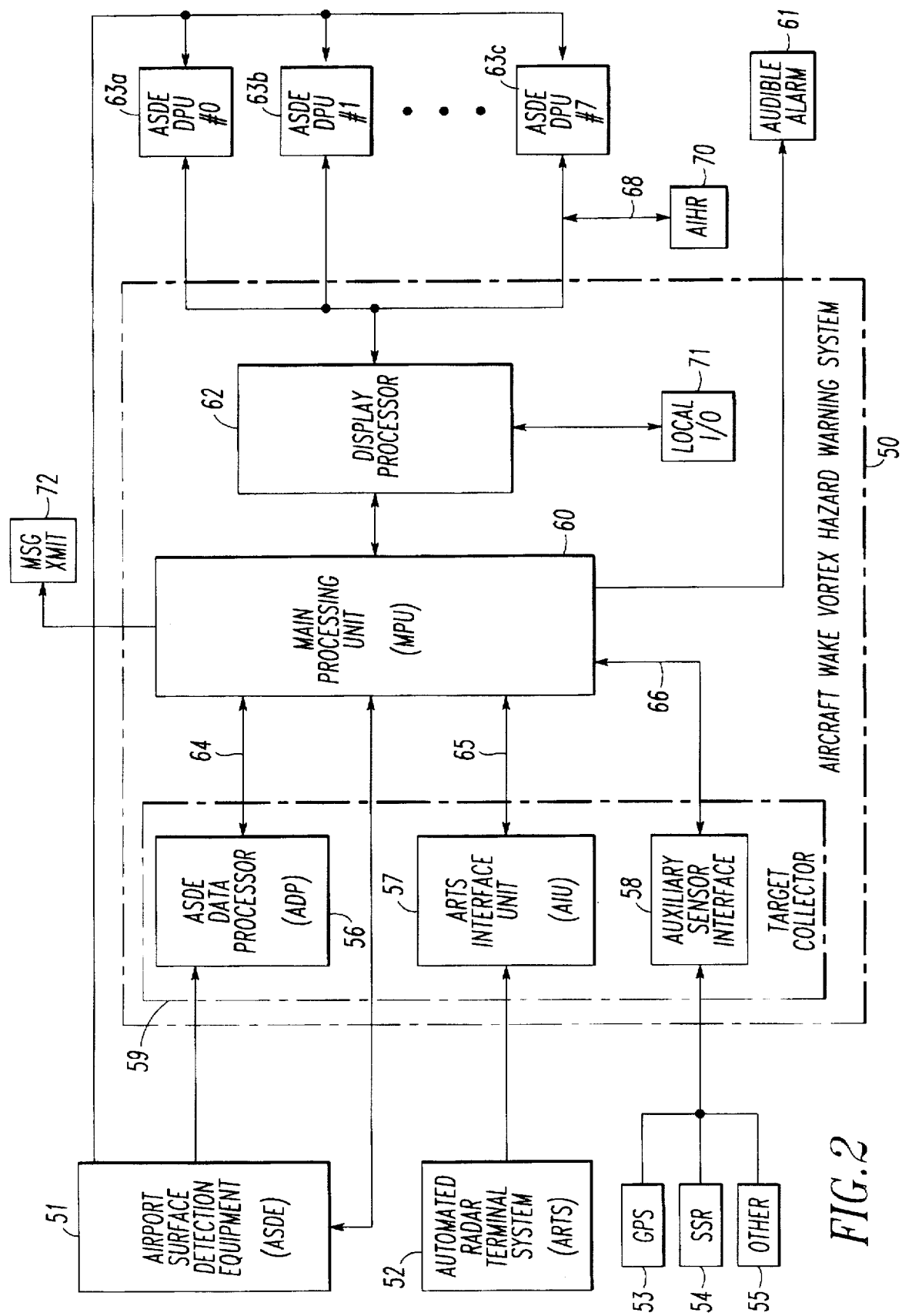
FIG. 2 is a block diagram of one embodiment of the AWVHW.

FIG. 2 illustrates one embodiment of an aircraft wake vortex hazard warning (AWVHW) apparatus according to the invention herein. AWVHW 50 can collect and fuse data from disparate sensors such as, for example, ASDE system 51, ARTS system 52, GPS sensor 53, SSR sensor 54, and other sensor 55, sensors 53, 54, and 55 being auxiliary sensors. Sensor 55 can be, for example, a microwave-based, laser-based, or infrared-based sensor system. As used herein, the term sensor is inclusive of a particular detector, such as a radar transceiver, and its associated processing equipment; one such sensor being ASDE system 51.

Because the data output by the aforementioned sensors may be presented to AWVHW 50 at different data rates and in different physical and logical formats, interface units such as ASDE data processor (ADP) 56, ARTS interface (AI) 57, and auxiliary sensor interface (ASI) 58 can be used to present data to main processing unit (MPU) 60 in a suitable format. Collectively, AI 57 and ASI 58 can be used, in part, to serve as target collector 59. In addition to acting as an interface to ASDE system 51, ADP 56 can provide additional signal processing for target extraction, although ground-based target data may not be required for wake vortex conflict analysis. ADP 56 also may perform target centroiding and target tracking.

Similarly, AI 57 can filter target data from the airport surveillance radar (ASR), and track ASR targets. MPU 60 can collect sensor inputs from and provide control and responsive outputs to ADP 56, AI 57, and ASI 58 by way of bidirectional data links 64, 65, and 66, respectively. In addition to sensor fusion, MPU 60 can correlate ASR and ASDE track files, manage target tracking, and provide audible alert generation including synthetic voice and audible tone messages, using audible alarm 61. MPU 60 can also provide airspace monitoring and situation analysis, employing a hazard monitoring supervisor. This supervisor can use selectable, predetermined hazard avoidance rules to determine the nature, probability, and priority of a plurality of possible hazard situations. A built-in self-test also may be incorporated into MPU 60. Local input-output device 71, for example, a keyboard and a video display, may be used by the operator when AWVHW 50 is implemented as a stand-alone unit.

Display processor 62 can effect warning symbol generation including hold bars, icons, symbol blinking, and the like. Display processor 62 also acts as the display interface between AWVHW system 50 and ASDE system 51. Processor 62 formats input for display on ASDE DPU 63a–c. MPU 60 can include a PC platform such as a PENTIUM®- or 80486-microprocessor-based personal computer or workstation system, with ADP 56, AI 57, and ASI 58 being connected to the PC platform by way of a special bus controller, for example, a MICROBUS channel, or a standard commercially-available interface controller. MPU 60 can provide automated warning information to pilots and ground controllers by providing such information to message transmitter 72. Automated warning information can be provided either when AWVHW 50 is used in conjunction with an AIHR system 70, or as a stand-alone unit.

The AWVHW 50 can have six modes of operation. First, the full operating mode permits AWVFW 50 to operate in conjunction with both the ASDE system 51 and ARTS system 52. This is because separate ASDE and ARTS data extractors 56, 57, respectively, provide data to 50 for coordination of target data processing. Where AWVHW 50 is used in conjunction with AIHR 70, the full operating mode causes AWVHW 50 to provide AIHR 70 with wake vortex hazard input 68.

Second, in the "non-ARTS" mode, the AWVHW 50 can be capable of operation without ARTS system 52. In the event ARTS unit 52 is not operational, the AWVHW 50 can continue to process other input information from ASI 58, to monitor the position and movement of targets proximate to each other.

Third, in the isolation mode, AWVHW 50 may be operated separately from ASDE system 51 without affecting the operation of ASDE system 51. In this mode of operation, ASDE system 51 does not rely on AWVHW 50 for inputs in data processing or display.

Fourth, the adaptation mode provides a unique setup for each aircraft approach and departure airspace sector traffic flow, where feasible. Menus can be provided for each airspace sector to specify both configuration and status.

Fifth, the setup mode specifies wake vortex hazard logic parameters and system parameters. These parameters may be entered using the AWVHW PC platform. In this mode, the tower staff can select a combination of airspace sectors, and applicable traffic flows and parameters. The groupings of predefined airspace sector configurations and associated definitions are buildable and selectable via keyboard to facilitate airport reconfiguration.

Sixth, a simulation mode can be provided to perform engineering development and training off line using recorded or scenario data and injected targets via PC platform input devices.

An integrator mode can also be implemented. In this mode, the target supervisor can integrate data from two or more disparate sensors such as, for example, airborne surveillance radar, secondary surveillance radar, and global positioning system-based sensors, ground-based sensors, and other auxiliary sensors to produce the target output for the target tracker.

The AWVHW apparatus can accept and retain both physical and operational runway and taxiway definitions, data separation rules, system parameters, and display alert priority conditions. The airspace sector physical data may be set-up upon installation of the apparatus. Separation parameters may be derived for each airport and aircraft type during apparatus testing and validation. Operational configurations and system parameters can be selectable. Alert priorities also can be selectable and may be programmed in software. Furthermore, adaptation airspace sector data may be grouped into user-selectable entities.

Figure 3:
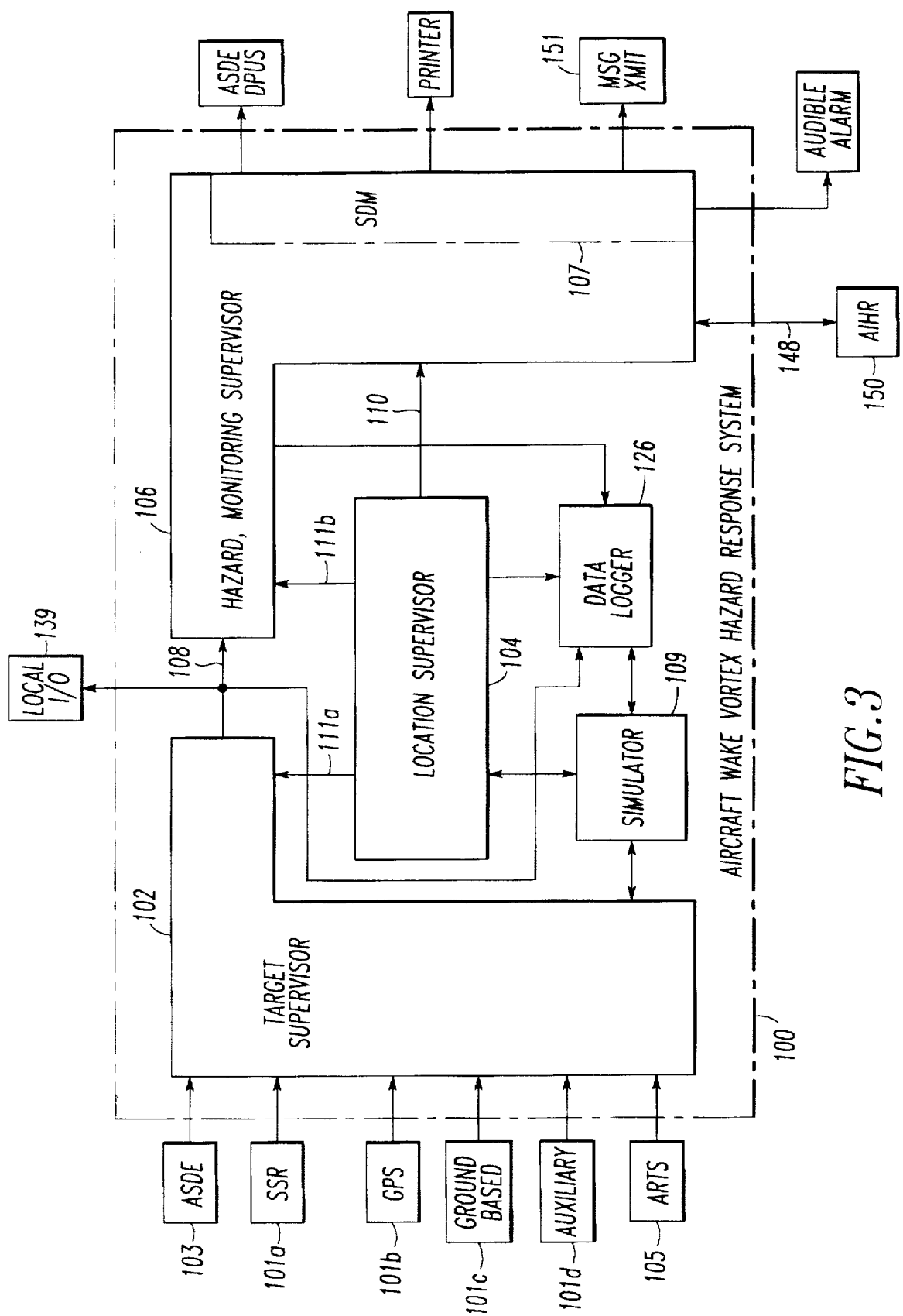
FIG. 3 is a illustration of one embodiment of the functional components of the AWVHW.

FIG. 3 present a functional illustration of an AWVHW according to one embodiment of the invention herein. AWVHW 100 provides an apparatus for monitoring the position of a plurality of objects in a predefined space having target supervisor 102 for characterizing and tracking a selected number of the objects, location supervisor 104 for characterizing and displaying predetermined features respective of the predefined space, and hazard monitoring supervisor 106 for detecting a plurality of predetermined hazard conditions responsive to target supervisor output 108 and location supervisor output 110, and for providing a detectable notice thereof. One of the predetermined hazard conditions includes a wake vortex hazard condition. Hazard monitoring supervisor 106 can include situation display manager 107 for producing and managing the detectable notice which may include visual, aural, and printed notice. Manager 107 also provides warning messages to controllers and pilots using message transmitter 151. Tranmission of the messages can be automated and can provide hazard avoidance information unique to the conflict situation at hand. In its minimal configuration, AWVHW 100 can include only target supervisor 102 and hazard monitoring supervisor 106. AWVHW 100 can be a stand-alone system or a component of AIHR 150.

Figure 4:
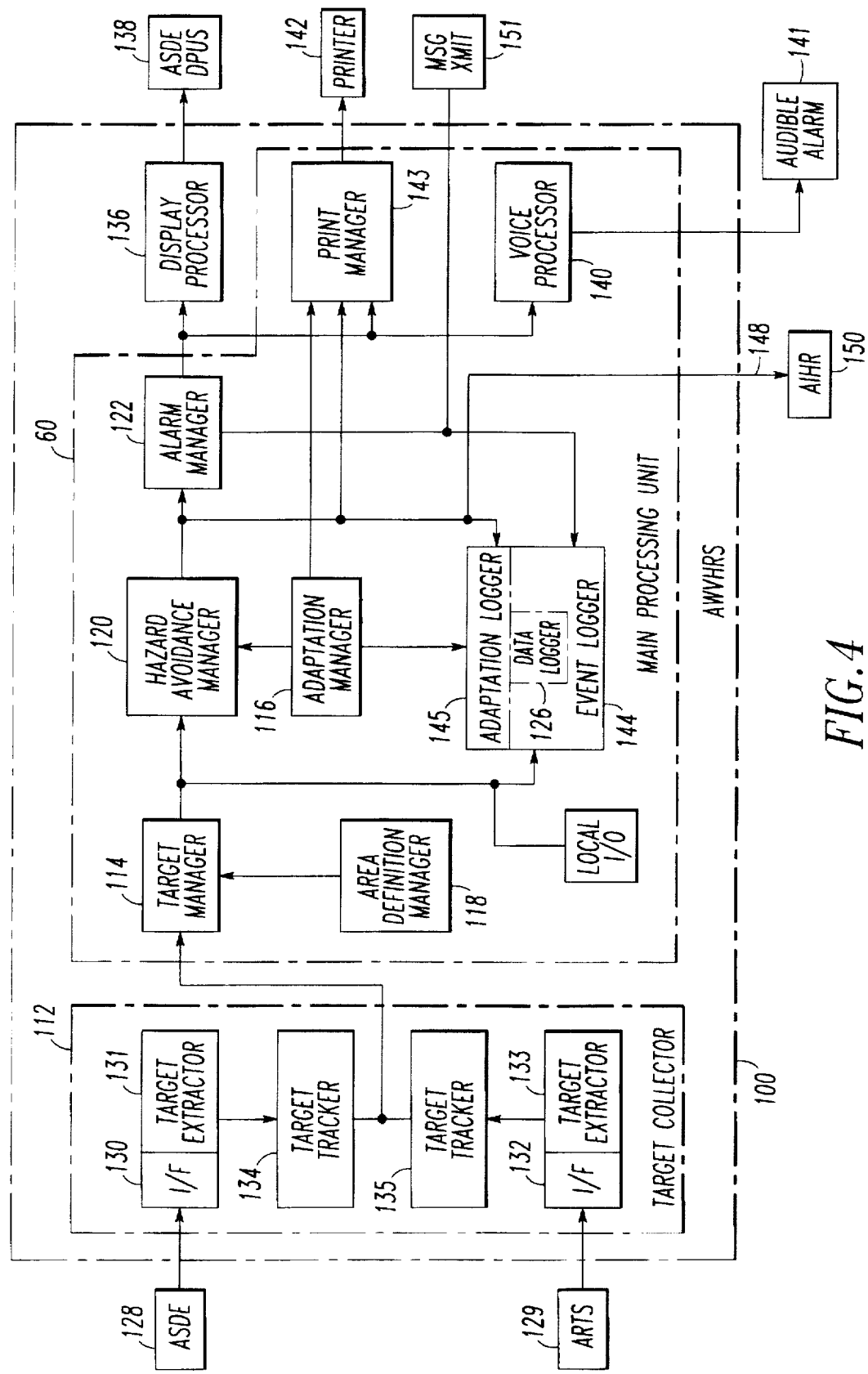
FIG. 4 is a detailed block diagram of the AWVHW shown in FIG. 3.

FIG. 4 provides an illustration of AWVHW 100 in FIG. 3 respective of a physical layout. Managers 114, 116, 118, 120, 122, and 143, logger 126, and processor 140 may be contained within MPU 60. Target supervisor 102 in FIG. 3 can include target collector 112 and target manager 114, seen in FIG. 4. Location supervisor 104 in FIG. 3 can include adaptation manager 116 and area definition manager 118, seen in FIG. 4. Hazard monitoring supervisor 106 in FIG. 3 can include hazard avoidance manager 120 and alarm manager 122, seen in FIG. 4. AWVHW 100 also can include data logger 126. Logger 126 may include an event logger 144 and an adaptation logger 145.

Continuing in FIG. 4, target collector 112 can extract and track target information received from at least one of an airborne surveillance detector 129 which can be, for example, an ARTS radar system, and a surface detection object detector 128, which can be, for example, an ASDE-3 radar system. Target collector 112 may also provide for synthetic target generation, injection, and playback, accepting target data from simulator 109 (FIG. 3).

Location supervisor 104 also may include an area definition manager 118 to provide selected milieu information therein to target supervisor 102. Included in the milieu information can be a clutter map, as well as selected system parameters, predefined constant tables, defined area parameters, and target tracking information. Such system parameters can include data from radar, latitude, and longitude sensors; pulse repetition frequency (PRF) data from radar; tower height; mode of operation; clutter update frequency; and scale factors. Tabular information can include trigonometric coefficient tables, a target ID table, and an alpha/beta filter coefficient table. System definitions can include primary and secondary information acquisition areas, and clutter areas. Tracking information can include target status, three-dimensional position, absolute altitude and relative altitude between aircraft, aircraft spatial separation, and absolute velocity and relative aircraft closing rates, as well as other selected tracking parameters, such as acceleration.

Area definition manager 118 also can include airport configuration data, approach space volumes, and movement/direction parameters in the milieu information. Airport configuration data can include "normal" surface directions, approach paths, and airport surface types. Movement/direction parameter inputs can include distance and velocity threshold ranges, and travel direction windows. Furthermore, area definition manager 118 can include information such as, for example, approach paths and directions, surface directions, surface direction codes, aircraft sector coordinates, surface boundary coordinates, surface intersection coordinates, runway threshold coordinates, and segment data.

Target manager 114 can perform at least eight functions. First, it can maintain target reports from ASDE 128, the playback system, and a synthetic target injection device in target collector 112. Second, target manager 114 can generate target states for use by other components of the system. Third, target manager 114 can compute spatio-temporal parameters such as target velocities and accelerations. Fourth, target manager 114 can determine the current location of targets on airport surfaces and within the airport airspace. Fifth, target manager 114 can predict the future location of targets on airport surfaces and within the airport airspace based on information including prior target reports, computed spatio-temporal parameters, and current target locations. Sixth, target manager 114 can provide to display processor 136 target information such as, for example, target identification, target type, and target position. Seventh, target manager 114 can detect target report anomalies. Eighth, target manager can provide the location, identification, and state vectors of each target to hazard avoidance manager 120.

Target manager 114, when provided surveillance and surface detection radar information from the interface units, determines directions of movement in free space, with respect to movement areas, or both, and classifies targets as either stopped (e.g., helicopters) or in one of a predetermined number of movement states. In addition, target manager 114 can predict future target locations based on derivation of three-dimensional position, velocity, and acceleration information from previous position reports. In one embodiment, a second-order fit of the previous five position reports can be used.

Target manager 114 can maintain target reports and compute target-related parameters such as, for example, position, velocities and accelerations. Target manager 114 can generate target states which may be provided to hazard avoidance manager 120 for analysis. Also, target manager 114 can determine whether targets are in an active airspace or air corridor and moving at speeds greater than or less than a selected speed parameter. Movement states may be based in part on detected vehicle speeds.

In general, target manager 114 analyzes and processes information regarding target location, direction, type, and movement. Target location can be with respect to a predefined position within the selected space, which can include a particular surface in the airport configuration. Target direction can be determined with respect to a particular surface direction.

Target manager 114 can determine target movement by comparing the target's current state with its previous state relative to a movement parameter database to provide the target movement data of interest. Target data can include information from at least one sensor, target identification data, position coordinates, velocity vectors, acceleration, and target state.

Target manager 114 can provide current and predicted target location information which includes the sector in which each target is located as well as the specific approach or departure corridor, which is based on the airport configuration. The current and predicted locations of each target can be provided for particular spatial sensors or air corridors within the airport airspace. In general, target direction can be used to determine whether the target is approaching other targets or objects. Where AWVHW 100 is used in conjunction with AIHR 150, ground-related information can be managed within a target manager in AIHR 150.

Outputs from the target manager can include target location, target direction, and target movement state. Target location can include the particular surface number or airspace sector where the target is located. Target direction can be the states which include a normal direction, an opposite direction, a "in the direction of", a "not in the direction of", and general direction, such as north, east, south, or west. Target movement states can include arrival, landing, departure, departure-abort, taxi, and stop.

Simulator 109 can provide synthetic physical objects and tracks, and operational situations including simulated hazard conditions to target supervisor 102, location supervisor 104, and hazard avoidance supervisor 106. Simulator 109 can be used, for example, to inject a selected number of objects, including debris, aircraft, and the like, into the desired predefined space and provide simulated aircraft separation violations in the vicinity of the airport, for purposes including routine and hazard-response training.

Adaptation manager 116 can maintain the plurality of predetermined physical and operational features respective of a predefined space including, for example, spatial configurations of an airport at which the apparatus may be installed. The predetermined features can be maintained as graphical entities which, when used in conjunction with the target manager, can permit AWVHW 100 to monitor targets on runways, taxiways, within intersections, on approach paths, and in the nearby airspace. Adaptation manager 116 can also maintain system parameters and support installation and operator data.

Hazard monitoring supervisor 106 can detect a plurality predetermined hazard condition responsive to target supervisor 102 and location supervisor 104, as seen in FIG. 3. One predetermined hazard condition includes a wake vortex hazard condition. Hazard monitoring supervisor 106 in FIG. 3 can include hazard avoidance manager 120 which analyzes information received from target manager 114 and from adaptation manager 116. Hazard avoidance manager 120 detects undesirable conditions, or hazards, such as a separation violation, or the incursion of one aircraft into a selected portion of the predefined space which is allocated to another aircraft. In addition, hazard avoidance manager 120 identifies and assigns a priority to an alert condition as provided by a preselected hazard rule set including wake-vortex-related spatial separation hazard rules.

Hazard avoidance manager 120 can use preselected parameters for analysis and detection of alert situations. Such parameters can include predetermined target separation parameters, airport configuration, and airborne and ground traffic situations. Separation parameters can include time separations, distance separations, times-to-intersections, and stop times on surfaces. The airport configuration can be with regard to runway/taxiway geometry, runway usage such as open/close, direction of movement, taxiway, airspace sector, approach paths, and the like, and segment state such as, segment under repair, snow plowing, maintenance, and the like.

Airborne traffic situation information can include data regarding approaching traffic such as an object's location and an aircraft's landing runway assignment. On the other hand, ground traffic situation can include information regarding moving and stopped traffic or obstructions on surfaces. This data can used in locating movement, providing movement direction, velocity, and acceleration, and the vehicle state. The spatio-temporal relationship between the two targets, respective of the targets' position in the monitored space can be maintained in a set of hazard avoidance logic tables. Where AWVHW 100 is used in conjunction with AIHR 150, ground-based traffic data management can be handled by AIHR 150.

Hazard avoidance manager 120 also can provide target-pair analysis by determining the relative positions of the target pair, and performing projection computations using the spatio-temporal parameters of the target pair to predictively select particular, predetermined projection situations which may be indicative of a hazard or alert situation. Such projection situations can include a "chase" situation, where two targets in a single air corridor are moving in the same direction, a "head-on" situation, where two targets in a single air corridor are moving towards each other, a "crossing" situation, where two targets are converging upon each other at an intersection and a "wake vortex" situation where one target is below and behind another target. Alerts may be filtered for being within predefined, three-dimensional (X, Y, and Z) distances, closure rates, or both, for given aircraft types and maneuvers. A no-problem situation can exist when either none of the aforementioned situations exits, or if, after target pair analysis, the target movements are projected to avoid a hazard or alert situation.

Using rules for intersections as delineated in the hazard avoidance logic tables in hazard avoidance manager 120, target manager 114 can determine whether a target is following below and behind a second airborne target of a general or particular type, and thus exposed to the second target's wake vortices, and determine whether an alert is required.

Hazard avoidance manager 114 also can assess the situation for landing an approaching aircraft to an active or inactive runway or airspace corridor. Where AWVHW 100 is used in conjunction with AIHR 150, runway assessment can be performed by AIHR 150. In addition, AWVHW 100 can provide aircraft wake vortex hazard condition information 148 to AIHR 150.

Hazard monitoring supervisor in FIG. 3 can include alarm manager 122, seen in FIG. 4, which can maintain the aforementioned alert priorities, can generate video and aural commands, and control the utilization of the alerts. Alert notification can include the use of voice warnings to operators, warning message transmissions to pilots, and graphical indicators such as icons around "caution" targets, flashing icons around "warning" targets, fixed hold bars, moving hold bars, and ARTS indicator lines. Alert notification also may include the provision of an alert message window required by hazard avoidance manager 120. Audio alerts can include voice alerts.

Alarm manager 122 can control the alert indications received from hazard avoidance manager 120 through prioritization, message scrolling, video display coordination, and repetitive alert suppression. Audio alerts and hazard warning transmissions can provide hazard avoidance instructions that are unique to the particular situation at hand. With alert prioritization, messages may be displayed in priority order based on the alert type, the movement state and the direction of target movement in an alert message window. Audio messages may be transmitted to particular aircraft frequencies, based on prioritization. With selective message scrolling, the five highest priority messages will remain on the display in the alert message window. Messages can remain on queue while the voice alarm alert is active. Those active messages which may have scrolled off of the message window can be redisplayed when the space is available.

Under video display coordination, voice messages may not be interrupted and the display can contain the message. In addition, text messages can remain active on the display while an incursion persists, and for at least as long as the spoken voice alert is provided. If desired, selected critical information may be repeated or repetitive alerts can be suppressed where subsequent alerts for the same targets and same conditions may not be reissued.

Alarm manager 122 can prioritize multiple alerts. For example, a warning has a higher priority than a caution. A situation involving two targets, for example, a wake vortex potential hazard situation, has a higher priority than one involving one target. Vehicles moving in a direction opposite to what is considered "normal" for the airspace have a higher priority than vehicles moving in the normal direction. Departures, arrivals, and landings have higher priority than taxied or stopped vehicles. Also, new conditions have a higher priority than sequential alerts for the same target. Every message can be assigned an individual priority. When used in conjunction with AWVHW 100, AIHR 150 can receive wake-vortex-related alerts 148 from AWVHW 100 in the alarm manager therein.

In general, a message processor in alarm manager 122 retrieves alert data from an alert queue, determines the classification and relative priority of the alert, and updates the display target status. Problem targets may be sent to display processor 136. Voice message and alert display messages may be generated with the message content based on alert condition and the associated sectors involved. Text messages may also be sent to display processor 136. In addition, if there are multiple messages, the message processor processes the next alert in the queue. Also, the message processor handles fresh alerts by cleaning up obsolete alerts.

Situation display manager 107 in FIG. 3 can provide video and aural alert information to the air traffic controllers via ASDE DPUs 138. The visual and aural situation indicia can include, for example, icons, alarm messages, menus, ARTS indicator lines, and fixed and moving hold bars, and are provided to DPUs 138 as video signals which can be transmitted to the ASDE display unit and overlaid upon the ASDE video display. In the absence of an ASDE system, the visual and aural situation indicia can be transmitted to local display unit 139.

If an alert condition exists from an approaching aircraft, the alert condition is displayed on the approach to the active runway using an ARTS indicator line. The ARTS indicator line is displayed next to the runway image to indicate the distance from the runway threshold, for example, three miles, the relative locations of two targets in a wave vortex violation, or both. Alarm manager 122 can display live target symbols, alert messages, and airport configurations for both live and simulated situations on both the AWVHW PC platform and the ASDE-3 displays by way of display processor 136. Alert message positioning on the display can be controlled by the operator.

Hold bars and alerts may be used to indicate the advisability of entering an active airspace sector. Each airspace sector may be divided into the preselected number of hazard logic cells for which alerts may be generated or suppressed. A moving hold bar may be placed in front of any targets involved in situations for which such is specified in the hazard logic tables.

Situation display manager 107 in FIG. 3 also may contain print manager 143 and voice processor 140 seen in FIG. 4. Print manager 143 can print current adaptation parameters or alternate sets of airport configuration adaptation parameters which are available for selection. Voice processor 140 can generate synthetic voice aural alerts which may be provided in the tower cab separately from the ASDE operational display units. Furthermore, print manager 143 manager can provide a hard copy of a particular situation by generating a printed report. Manager 107 also may send hazard warning messages to pilots and other operators and controllers using a warning message transmission device, such as message transmitter 151 in FIGS. 3 and 4.

AWVHW 100 can also include data logger 126 which may retain situational information such as, the data pertinent to a particular event, and the data associated with a particular set of features respective of the monitored space, for example, adaptation data. Data logger 126 can have the capability to record all setup data including safety and system parameters, maps, configurations, and clutter maps. It can also record cautions, warnings, controller queues, and target data. This information can be time-tagged whenever an update in an item occurs. Other information such as adaptation conditions, events, and selective area filtering data can be recalled from storage by the operator for future use.

While specific embodiments of practicing the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

I claim:

1. An apparatus for monitoring the position of at least two aircraft in an approach pattern to an airport, comprising:

(a) a target supervisor for characterizing and tracking said aircraft, said target supervisor receiving target data from at least one sensor, said target supervisor providing a plurality of outputs indicative of at least position and velocity parameters of said aircraft; and (b) a hazard monitoring supervisor responsive to said outputs and operable to compare said outputs with a predetermined rule base governing a wake vortex hazard condition and to provide a detectable notice of a wake vortex hazard condition if said parameters violate said rule base.

2. The apparatus of claim 1 wherein said at least one sensor is from the group consisting of an airborne surveillance radar and a secondary surveillance radar and a global positioning-system based sensor and a ground-based sensor and a microwave-based sensor and a laser-based sensor and an infrared sensor and an auxiliary sensor.

3. The apparatus of claim 1 wherein said hazard monitoring supervisor automatically transmits a warning message to at least one of a controller and a pilot responsive to said wake vortex hazard condition.

4. The apparatus of claim 3 wherein said warning message is unique to said wake vortex hazard condition.

5. Apparatus according to claim 1 wherein:
   (a) said outputs indicative of aircraft parameters include an output indicative of aircraft absolute altitude.

6. Apparatus according to claim 1 wherein:
   (a) said outputs indicative of aircraft parameters include an output indicative of relative altitude between aircraft.

7. Apparatus according to claim 1 wherein:
   (a) said outputs indicative of aircraft parameters include an output indicative of aircraft spatial separation.

8. Apparatus according to claim 1 wherein:
   (a) said outputs indicative of aircraft parameters include an output indicative of relative aircraft closing rates.

9. Apparatus according to claim 1 wherein:
   (a) said outputs indicative of aircraft parameters include an output indicative of aircraft acceleration.

10. Apparatus according to claim 1 wherein:
    (a) said outputs indicative of aircraft parameters include an output indicative of aircraft type.

11. Apparatus according to claim 1 wherein:
    (a) said outputs indicative of aircraft parameters include an output indicative of aircraft heading.

* * * * *